May 2, 1967 J. H. BOICEY ETAL 3,317,710
LAMINATED SAFETY GLASS UNITS
Filed July 9, 1964
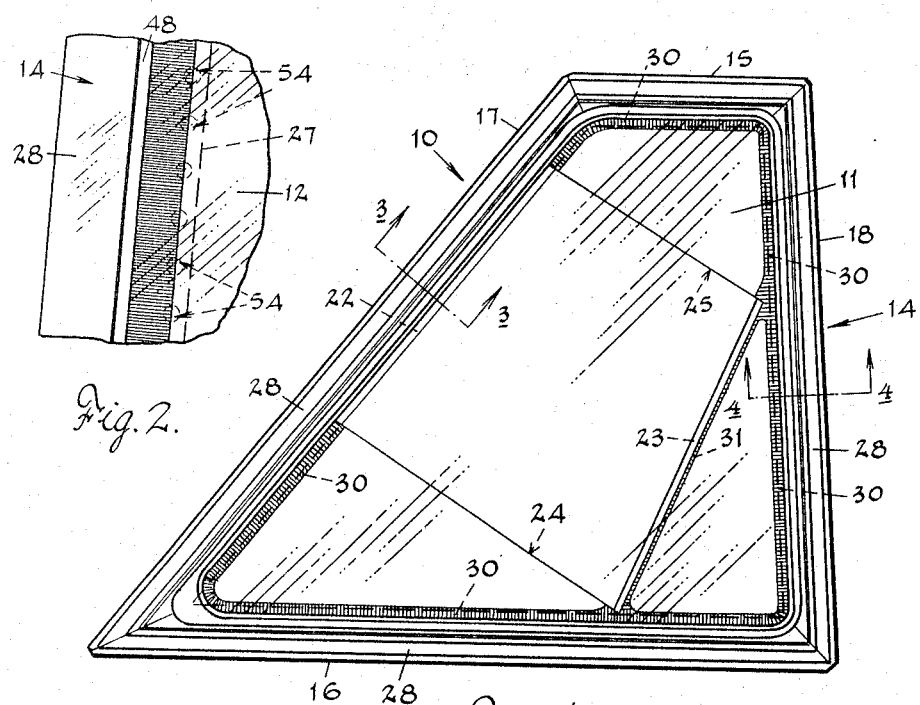
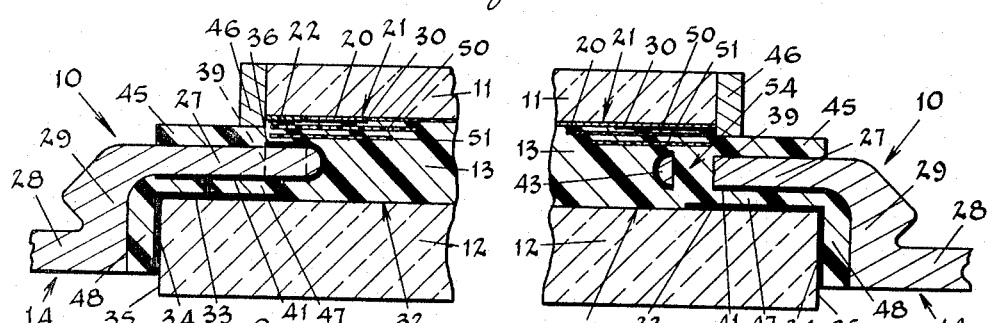
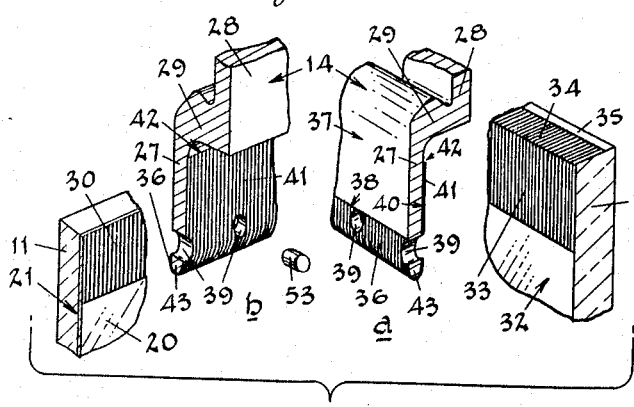
INVENTORS
James H. Boicey and
BY James G. Marriott
Nobbe & Swope
ATTORNEYS

United States Patent Office 3,317,710
Patented May 2, 1967

3,317,710
LAMINATED SAFETY GLASS UNITS
James H. Boicey, Toledo, and James G. Marriott, Perrysburg, Ohio, assignors to Libbey-Owens-Ford Glass Company, Toledo, Ohio
Filed July 9, 1964, Ser. No. 381,377
8 Claims. (Cl. 219—543)

The present invention relates broadly to laminated safety glass and more particularly to units of this character that are especially adapted for use in aircraft.

Laminated safety glass per se is of course well known and, generally speaking, is made up of two or more sheets of glass and one or more interposed layers of tough, flexible, thermoplastic material all bonded together under the action of pressure to produce a unitary composite structure. As produced by present day techniques, and when used in automobile windshields for example, it is a very stable article under all normal weather and temperature conditions.

However, for aircraft use, the laminated units usually include some specifically different features and are subjected to much more severe conditions. Thus, as a window or windshield in an airplane at high altitudes, the surface of a laminated unit facing the interior of the plane will be exposed to normal room temperatures while the outside surface of the unit may be exposed to temperatures as low as $-70°$ F.

Moreover, for deicing purposes, an electrically conducting coating is often employed within the laminated structure and, in operation, such a coating and the glass and plastic surfaces adjoining it will be exposed to much higher than room temperatures which further increases the extremes to be tolerated.

Another condition quite common to laminated safety aircraft glazings occurs with so-called extended plastic type laminations in which the surface area of the plastic interlayer is greater than the surface area of one or more of the glass sheets to create a perimeter flange of plastic which may be employed for mounting the laminated structure in the airplane. In such constructions, the perimeter flange may approximate or be of a thickness comparable to the over-all thickness of the laminated structure so that, in addition to extending beyond the margins of the glass sheets, the extension of the plastic interlayer may cover the edges and form a rim around the glass sheets thus creating areas of plastic to glass adhesion quite susceptible to edge separation and failure.

Finally, it may be necessary or desriable to employ a metal insert in the extended plastic interlayer either for reinforcement or to provide an essential part of the mounting flange and this introduces an additional factor, and creates further problems.

A detailed study of these facts has led to the conclusion that most of the problems that are more or less peculiar to laminated aircraft glass result, first, from the fact that laminating techniques have improved to the point where the bond between the plastic interlayer and the glass, the electrically conducting film and/or the metal insert in the unit may, and often does, show adhesive forces greater than the cohesive forces in the glass itself or the tear resistance of the plastic; and, second, from the relative movement of the laminations that is due to the excessive temperature differentials within the unit in use and the wide differences in expansion and contraction coefficients of the glass, plastic and metal employed.

Thus, the coefficient of linear expansion of polyvinyl butyral of the type used in commercial laminated safety glass is $52 \times 10^{-6}/°$ F. between $-90°$ F. and $-20°$ F.; and it is $121 \times 10^{-6}/°$ F. between $+75°$ F. and $+150°$ F. On the other hand, the coefficient of linear expansion of the assignee company's automotive plate or color clear glass, used in windshields, is approximately $5 \times 10^{-6}/°$ F. in the above temperature ranges. Or, simply expressed, the linear expansion of the plastic is between 10.5 and 24 times greater than that of glass.

A similar physical situation exists in the case of the metals commonly used for reinforcing inserts or metal attaching flanges. Aluminum, for example, has a linear expansion of $11.9 \times 10^{-6}/°$ F. between $-58°$ F. and $+68°$ F.

Consequently, a laminated structure composed of wellbonded layers of these different materials having such widely varying coefficients of linear expansion is comparable in action to a bimetallic thermostat construction; and the several factors of wide extremes of temperature, increased plastic to glass contact and metal insert layers, that are peculiar to laminated aircraft glass, all serve to aggravate or intensify the tendency of such composite structures to fail by rupture or tearing of one or more of the layers, by edge separation, or by blow-outs or leaks, under the temperature and pressure differentials encountered in normal use.

Accordingly it is the primary object of this invention to minimize if not completely overcome failures in specially designed laminated safety glass units when exposed to extreme conditions.

Another object is to provide laminated safety glass structures of novel and improved design that are particularly adapted for use in glazing high altitude aircraft.

Briefly stated these and other objects of the invention are obtained by the provision, in a laminated safety glass unit, of (1) an elastic separating medium between the plastic interlayer and one or more of the other laminations of the composite structure in areas where relative movement between contiguous surfaces of the laminations are most likely to have a disruptive effect and (2) bridging or connecting portions between laminae of the plastic interlayer that are located on opposite sides of laminae of dissimilar materials.

Other objects and advantages of the invention will become more apparent during the course of the following description when read in connection with the accompanying drawings.

In the drawings, wherein like numerals are employed to designate like parts throughout the same:

FIG. 1 is a side elevation of one form of laminated safety glass unit produced in accordance with the present invention;

FIG. 2 is an enlarged fragmentary view of the reverse side of the unit of FIG. 1;

FIG. 3 is a horizontal section of the unit as taken on line 3—3 of FIG. 1;

FIG. 4 is a similar horizontal section taken on line 4—4 of FIG. 1; and

FIG. 5 is an exploded perspective view of the glass and metal components of the unit.

The laminated safety glass aircraft glazing, shown by way of example in FIG. 1 and designated in its entirety by the numeral 10, comprises generally two panels 11 and 12 of plate or sheet glass of any desired composition, one or the other or both of which may be tempered or semi-tempered, an interposed layer 13 of a tough, flexible thermoplastic material, such as polyvinyl butylral resin, and a metal insert 14, which may be of aluminum.

This particular unit is substantially trapezoidal in outline with upper and lower, substantially parallel edges 15 and 16, respectively, and upwardly convergent side edges 17 and 18 which are not located in equal angular relation to the adjoining upper and lower edges 15 and 16. Also in the illustrated embodiment, the metal insert 14 is a mounting frame of a relatively heavy cast or extruded formation with its inner margins embedded in the plastic interlayer 13 and its outer margins forming the mounting flange for the complete unit.

As best seen in FIGS. 1 and 3, the glass panel 11 is provided with an electrically conducting film 20 on its inwardly directed surface 21; said film being in electrical contact with suitable electrodes 22 and 23. As is usual in the use of electrically conducting films, the effective area of the film is made as nearly rectangular as convenient and with two of the sides of said area being parallel to at least one of the marginal edges of the associated glass panel. Thus, as herein disclosed, the film is applied to the entire area of the surface 21, but the area to be electrically excited is confined between the electrodes 22 and 23 by means of boundary paths 24 and 25 produced by deleting the film by abrading or with a suitable solvent.

According to one preferred method of applying the electrodes 22 and 23 to the surface 21 of glass panel 11, one marginal portion and a substantially parallel selected area of the panel's surface are sprayed or otherwise provided with an electrically conducting silver flux prior to laminating. With the electrodes 22 and 23 in place, the panel 11 is filmed by first heating it to approximately the softening point of the glass and then spraying the surface 21 with a solution of stannic tetrachloride to deposit a clear, transparent, electrically conducting layer of tin oxide on the glass, over and in contact with the electrodes 22 and 23. The heating of the glass panel, preparatory to the filming operation also serves to fuse the silver flux to the glass.

In assembling the laminated safety glass unit 10, a plastic interlayer is provided of a size to extend outwardly beyond at least one glass panel and is formed to extend around the edge portions of the second panel. This is necessary in part because of the particular formation of the metal frame 14 which has an inwardly directed flange 27 and an outer flange 28 constituting the element by which the unit 10 is installed and supported in its functional position. In other words, the frame is substantially Z shaped in cross-section with the flange 27 being located as an insert in the body of the plastic interlayer, the web 29 enclosing at least a marginal edge portion of the interlayer, and the flange 28 projecting outwardly therebeyond.

The frame 14 differs from other metal insert members commonly employed in laminated safety glass units having extended plastic margins. One difference is the relative thickness of particularly the insert flange 27 which may be four or five times greater than conventional reinforcing metal inserts. In this respect and while the plastic interlayer inwardly of the flange 27 is of the required maximum thickness, the thicknesses of the areas of plastic between each sheet of glass and the flange 27 are considerably thinner. The average thickness of the frame being greater, there is also a more pronounced influence for the differential in expansion and contraction to be experienced between the metal flanged portion 27 and the adjacent thicknesses of the plastic interlayer 13.

However, according to this invention, failures of the character to which an aircraft glazing of this construction, if produced by conventional automotive laminating techniques, would inherently be susceptible in use are prevented by the following procedures.

First, before actual assembly of the glass panels 11 and 12 and frame 14 with the necessary plastic layers or elements to form the plastic interlayer 13, the marginal and/or edge portions of the panels and the frame wherever they are to face one another are provided with a relatively thin layer of an elastic separating medium that will permit relative movement between the opposed interfacial surfaces of the glass and plastic and of the metal and the plastic in these areas after laminating.

The material used for the separating layer preferably has less adhesion to the glass and metal surfaces than to the plastic surfaces with which it is in contact but must be of an elastic character and remain so under severe temperature conditions.

In the unit 10, the flexible, elastic material is provided in the inner surface 21 of glass panel 11 as a layer 30 extending inwardly from the four opposite marginal edges thereof. The layer 30 along the convergently angled margin 17 thus extends over the electrode 22 and adjacent area of the electrically conducting film 20 and the areas of the film on the remaining marginal edge portions of the panel. Additionally, a layer 31 is provided over the electrode 23 with the end of the layer 31 continuing into those portions of layer 30 overlying the adjacent sides of the panel 11. Similarly and as in FIG. 5, the marginal edge portions of the inwardly directed surface 32 of the glass panel 12 has a layer 33 with said layer also being deposited as layer 34 on a portion of the edge surface 35. With regard to the flange 27 of mounting frame 14, the layer 36 on the surface 37 thereof facing panel 11, as at $a$, has an inner limit, designated by the numeral 38, that is approximately opposite the inner edge limit of layer 30 on the panel 11; said layer limit 38 also bounding the inner edges of holes 39 provided in the flange 27. On the opposite surface 40 of the flange 27, as at $b$, a layer 41 is provided having a limiting edge, designated by the numeral 42, that is approximately opposite the inwardly disposed corner of the panel 12 over which the layer 33 is extended as at 34. As indicated in FIGS. 3 and 4 as well as in FIG. 5, it will be noted that the layers 36 and 41 are actually continuous and integral from the limit edge 38, around the rounded edge portion 43 to the opposite limit 42.

One suitable material which has been found highly acceptable as a separator layer for this purpose is a polysulfied rubber. Other suitable materials include the synthetic rubber cements and the Thiokols. As usually applied, the material is deposited on the respective surfaces between the adjacent edge and suitably placed strips of masking material which permits a layer of predetermined width to be readily and rapidly applied. Before assembly of the components of the ultimate unit, the layer material is allowed to air-dry or the drying may be accelerated in a suitable low-temperature oven.

Secondly, according to the invention the flange 27 is provided with openings, such as the regularly spaced, aligned holes 39, shown in FIGS. 4 and 5 as located along and adjacent the rounded edge portion 43, to permit bridging or connection of the plastic layers that will be on opposite sides of the embedded metal mounting flange in the finished unit.

The several components of the unit are now properly prepared for incorporation into an integral composite structure and the first step is to assemble the necessary plastic elements or plies of plastic to form the body of the plastic interlayer 13. These elements or plies of course are built up between the glass panels 11 and 12 and over and about the mounting frame 14 to provide the interlayer with an extended margin 45 outwardly of the panel 11, the edge surface of which is later covered by a strip of installation or mounting beading 46, and a margin 47 with a flanged extension 48 over the edge surface 35 of the panel 12. In this connection, as the plies of thermoplastic material are built up it may be found desirable to include spaced layers of transparent tape, such as "cellophane," between the plies or layers in the vicinity of the electrodes and also in similar locations about the unit. These layers, indicated at 50 and 51, help to compensate for the differential of coefficients of expansion and contraction between the plastic and glass particularly around the marginal edge portions and fused electrode layers.

An important feature of the invention is the provision of plastic bridges, plugs or inserts 53 (FIG. 5) in each of the plurality of holes 49 in the flange 27 of the mounting frame. After lamination of the several layers of glass panels, metal frame and thermoplastic material together, under heat and pressure, in accordance with any of the well-known laminating procedures, these plastic inserts become integral portions 54 of the plastic interlayer 13 and securely join the plastic layers on opposite sides of the mounting flange or frame.

This feature is particularly valuable in a laminated safety glass unit as herein illustrated because the thicknesses of the body of the plastic interlayer 13, between the opposed surfaces of the glass panels 11 and 12 and of the insert flange 27, are relatively thin and therefore highly susceptible to being torn from their laminated position. This is particularly true in view of the differences in their capacities to expand and contract but more importantly by reason of the fact that the extended portions of the interlayer, i.e., the extended margin 45, are not supported by any securing element. Consequently, in the event of breakage, as in the case of failure of the panel 12, the differences of atmospheric pressure between the pressurized interior of the aircraft and the rarefied atmosphere through which the same may be moving could cause the margins of the plastic interlayer to be physically ruptured and torn from about the insert flange. In this event, the rapid loss of pressure within the aircraft will endanger the lives of the operators or pilots unless the craft can be rapidly brought to a sufficiently lower altitude for the pressure within the aircraft and the pressure of the outside atmosphere to be equalized. The integral plugs or bridges 54 stabilize the margins of the plastic interlayer from such dangerous separation, particularly along the surfaces of the insert flange and safely anchor and interlock the plastic to the flange. Since these plug portions 54 are arranged entirely around the sides of the unit, the immediate areas of the plastic interlayer are firmly held from movement relative to the flange. This will ensure that although failure of the glass might occur, the retention factor afforded by the plugged portions of the plastic will prevent further tearing or total rupture of the plastic and the creation of air pressure leakages within the unit.

Indeed, under tests in cold rooms at temperatures around −65° F., units of the general design shown and described here but which were produced by regular automotive laminating techniques exhibited electrode to film interface separation, with resultant arcing and electrode failure when current was applied; fracture and tearing of the surfaces and corners of the glass laminae; and leaks and edge separation in the area of the mounting flange.

On the other hand, inclusion of the elastic separating material and the plastic bridging features of this invention have eliminated these various types of failures and provided a successful laminated safety glass unit that is commercially acceptable for high altitude aircraft use.

It is to be understood that the form of the invention herewith shown and described is to be taken as a preferred embodiment of the same, and that various changes in the shape, size and arrangement of parts may be resorted to without departing from the spirit of the invention.

We claim:

1. A laminated safety glass unit, comprising two sheets of glass and a non-brittle thermoplastic interlayer between said glass sheets and bonded thereto to form a composite structure, a metal insert embedded in the marginal edge portion of said plastic interlayer, layers of an elastic material between the marginal edge portions of the glass sheets and plastic interlayer and adherent thereto, layers of elastic material also between the opposite surfaces of the metal insert and the plastic interlayer and adherent thereto, said metal insert being provided with at least one opening, and a plastic bridge in said opening joining the plastic interlayer on one side of said metal insert with the plastic interlayer on the opposite side of said metal insert.

2. A laminated safety glass unit as claimed in claim 1, in which the layers of elastic material are less adherent to the glass sheets and to the metal insert than to the plastic interlayer.

3. A laminated safety glass unit as claimed in claim 1, in which the layers of elastic material are applied to the marginal portions of said glass sheets and said metal insert and also to the peripheral edges of one glass sheet and said metal insert.

4. A laminated safety glass unit as claimed in claim 1, in which said elastic material is a polysulfide rubber and said plastic bridge is of the same material as said plastic interlayer.

5. A laminated safety glass unit as claimed in claim 1, in which said metal insert constitutes an inwardly directed flange of a substantially continuous metal mounting frame surrounding the unit, said inwardly directed flange being provided with a plurality of openings along the length and adjacent the inner edge thereof, and plastic bridges being received in said openings.

6. A laminated safety glass unit as claimed in claim 1, in which a first sheet of glass extends outwardly beyond the edge of the second glass sheet and the plastic interlayer extends outwardly beyond the edge of the first glass sheet and covers at least part of an edge thereof, said metal insert extending inwardly of the edge of said first glass sheet, the layer of elastic material on the marginal portions of said first glass sheet facing said metal insert and also covering the peripheral edge of said sheet.

7. A laminated safety glass unit as claimed in claim 6, in which said metal insert constitutes a mounting frame for the unit and comprises an inwardly directed flange extending inwardly beyond the edge of said first glass sheet and embedded in the plastic interlayer, an outwardly directed mounting flange and a web portion joining the inwardly and outwardly directed flange, said web portion extending substantially transversely to the inwardly directed flange and overlying that portion of the edge of the first glass sheet covered by said plastic interlayer, a plurality of openings provided in said inwardly directed flange adjacent the inner edge thereof, and plastic bridges received in said openings and integrally bonding the portion of the plastic interlayer on one side of the inwardly directed flange to the portion of the plastic interlayer on the opposite side of said inwardly directed flange.

8. In a laminated safety glass unit as claimed in claim 6, in which electrodes are applied to the inner surface of the second glass sheet in spaced substantially parallel relation, a transparent coating of electrically conducting material on said inner surface of the glass sheet in contact with said electrodes, the layer of elastic material on the marginal portions of the second glass sheet overlying one of said electrodes, and a layer of elastic material overlying the other of said electrodes.

References Cited by the Examiner

UNITED STATES PATENTS

| | | | |
|---|---|---|---|
| 2,552,955 | 5/1951 | Gaiser et al. | 219—543 X |
| 2,650,976 | 9/1953 | Gaiser et al. | 219—522 |
| 2,977,450 | 3/1961 | Boicey | 219—541 |
| 2,991,207 | 7/1961 | Miller | 219—203 |

ANTHONY BARTIS, *Primary Examiner.*

V. Y. MAYEWSKY, *Assistant Examiner.*